(12) United States Patent
Kajikawa et al.

(10) Patent No.: US 6,682,096 B2
(45) Date of Patent: Jan. 27, 2004

(54) METHOD OF FORMING A BODY FRAME STRUCTURE FOR A FOUR-WHEELED BUGGY

(75) Inventors: Tsuneo Kajikawa, Saitama (JP); Yuichiro Tsuruta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/157,135

(22) Filed: May 30, 2002

(65) Prior Publication Data

US 2002/0135209 A1 Sep. 26, 2002

Related U.S. Application Data

(62) Division of application No. 09/354,905, filed on Jul. 16, 1999, now Pat. No. 6,412,856.

(30) Foreign Application Priority Data

Jul. 16, 1998 (JP) .......................................... 10-202384

(51) Int. Cl.⁷ ............................................... B62D 21/00
(52) U.S. Cl. ........................ 280/797; 280/796; 280/798
(58) Field of Search ............................... 280/781, 796, 280/797, 798; 180/291, 311, 908

(56) References Cited

U.S. PATENT DOCUMENTS

| | | | |
|---|---|---|---|
| 4,533,172 A | | 8/1985 | Oliver |
| 4,687,069 A | * | 8/1987 | Inomata et al. .......... 123/41.33 |
| 4,735,275 A | * | 4/1988 | Tsukahara et al. .......... 180/215 |
| 4,770,262 A | * | 9/1988 | Yasunaga et al. ........ 123/41.65 |
| 4,776,417 A | * | 10/1988 | Takeuchi et al. ............. 180/311 |
| 4,852,678 A | * | 8/1989 | Yamaguchi ................. 180/219 |
| 4,892,164 A | | 1/1990 | Yasui et al. |
| 5,211,255 A | | 5/1993 | Fukuda |
| 5,284,221 A | | 2/1994 | Warne |
| 5,480,001 A | | 1/1996 | Hara |
| 5,575,352 A | | 11/1996 | Suzuki et al. |
| 5,704,442 A | * | 1/1998 | Okazaki et al. ............. 180/219 |
| 5,791,431 A | | 8/1998 | Asao et al. |
| 5,845,728 A | * | 12/1998 | Itoh et al. .................... 180/219 |
| 5,921,339 A | | 7/1999 | Matsuura |
| 6,085,857 A | * | 7/2000 | Horiuchi ..................... 180/292 |
| 6,290,015 B1 | * | 9/2001 | Horii et al. ................. 180/219 |
| 6,412,856 B1 | * | 7/2002 | Kajikawa et al. ........... 180/311 |

FOREIGN PATENT DOCUMENTS

| | | |
|---|---|---|
| EP | 0 447 899 A1 | 9/1991 |
| FR | 2 575 719 | 7/1986 |
| JP | 3-193584 | 8/1991 |
| JP | 3-204386 | 9/1991 |
| JP | 5-39077 | 2/1993 |
| JP | 7-41861 | 5/1995 |

* cited by examiner

*Primary Examiner*—Eric Culbreth
*Assistant Examiner*—Toan C To
(74) *Attorney, Agent, or Firm*—Birch, Stewart, Kolasch & Birch, LLP

(57) ABSTRACT

A body frame structure for a four-wheeled buggy which is constructed by separately preparing the front sub-assembly and the rear sub-assembly and fastening the rear sub-assembly to the front sub-assembly. The front sub-assembly is composed of a pair of sub-assembly parts each of which is formed as an approximate loop shape including a main frame, a front down frame, a lower frame, and a center frame. Rear ends of the main frames are welded to upper ends of the center frames via a cross pipe. Brackets are provided on upper portions of the center frames in such a manner as to extend upwardly therefrom. Upper fastening portions provided at front ends of seat rails constituting part of the rear sub-assembly are fastened to mounting holes formed in the brackets. Stays are provided on lower portions of the center frames, and lower fastening portions provided at front ends of right and left back stays are fastened to the stays. With this configuration, since the stays and the brackets are provided on the same members, that is, the center frames, even if the front sub-assembly is previously constructed by welding, it is possible to prevent deviation in dimensional accuracy of portions of the front sub-assembly 1 to which the rear sub-assembly 2 is to be fastened.

7 Claims, 6 Drawing Sheets

METHOD OF FORMING A BODY FRAME STRUCTURE FOR A FOUR-WHEELED BUGGY

This is a divisional of application Ser. No. 09/354,905, filed Jul. 16, 1999, now U.S. Pat. No. 6,412,856.

BACKGROUND OF THE INVENTION

1. Field of the Invention

The present invention relates to a body frame structure for a four-wheeled buggy.

2. Description of the Related Art

Japanese Patent Publication No. Hei 7-41861 discloses a body frame for a four-wheeled buggy. The body frame is constructed by separately preparing a front body frame for supporting an engine, and a sub-frame (rear body frame) for supporting a load-carrying platform. Upper fastening portions are provided on seat rails and back tubes of the sub-frame for obliquely connecting the seat rails to lower frames passing under the engine.

In the above structure, the upper and lower fastening portions provided on the sub-frame are fastened to the seat rails and the back tubes. Accordingly, if the body frame is constructed by welding the front body frame, such as the back tubes and the seat rails to each other, then when fastening the sub-frame to the front body frame, the dimensions of the seat rails and the back tubes to which the upper and lower fastening portions are to be fastened, may deviate due to the welding of the back tubes to the seat rails. This makes it difficult to maintain dimensional accuracy of the portions of the seat rails and the back tubes to which the upper and lower fastening portions are to be mounted and hence to readily assemble the sub-frame to the front body frame.

To solve such a difficulty in constructing the body frame by fastening the sub-frame to the already assembled front body frame, the body frame must be constructed by fastening the seat rails and the back tubes to the sub-frame before welding the back tubes to the seat rails. The front body frame is then constructed by welding components such as the back tubes and the seat rails to each other.

However, in the above-described assembling process, since the large-sized members, which are substantially comparable to the body frame, must be assembled by welding, the handling performance is degraded and the assembling efficiency is significantly reduced. Accordingly, it is desirable to separately sub-assemble the front body frame and the rear body frame and then fasten the sub-assemblies to each other in order to construct the body frame.

Further, the body frame is required to have a high rigidity against a transverse load applied to the seat rails. That is, high transverse rigidity is required when the body frame is used with a four-wheeled buggy of the type including two front wheels and two rear wheels, wherein the rear wheels are supported via a common axle on the right and left sides of a rear end of a rear swing arm with its front end swingably supported to a vehicular body. To be more specific, for such a four-wheeled buggy of this type, a torsional force is applied to a vehicular body when the buggy is turned, and even during usual running with no turning, a torsional force is also applied to the vehicular body due to a difference in height between the two rear wheels when the buggy runs on irregular road surfaces. As a result, the vehicular body of the four-wheeled buggy of this type, particularly, a sport buggy is required to have a transverse rigidity much larger than that of a saddle type motorcycle.

SUMMARY OF THE INVENTION

To solve the above-described problems, according to the present invention, there is provided a body frame structure for a four-wheeled buggy of a type which includes two front wheels and two rear wheels, the rear wheels being supported via a common axle on right and left sides of a rear end of a rear swing arm with its front end swingably supported by a vehicular body, the body frame structure including: a front body frame for supporting an engine, and a rear body frame for supporting a seat, the front body frame and the rear body frame being previously constructed into different sub-assemblies and then fastened to each other into one-body; wherein the front body frame includes a pair of right and left main frames extending in the longitudinal direction while passing above the engine, and a pair of right and left center frames extending downwardly from rear ends of the main frames while passing behind the engine, and the rear body frame includes a pair of right and left seat rails for supporting a saddle type seat, a pair of right and left upper fastening portions provided at front ends of the seat rails, and a pair of right and left lower fastening portions provided under the upper fastening portions; and wherein the right and left upper fastening portions are connected to each other with a cross member, and the right upper fastening portion and the right lower fastening portion are commonly fastened to the right center frame and the left upper fastening portion and the left lower fastening portion are commonly fastened to the left center frame.

With this configuration, since the portions, to which the upper and lower fastening portions of the rear body frame are to be mounted, are formed on the same members, that is, the center frames, the upper and lower fastening portions of the rear body frame can be fastened to the same members, as opposed to different members as is conventionally known. Accordingly, even if the main frames are welded to the center frames to sub-assemble the front body frame before the rear body frame is fastened to the front body frame, it is possible to keep dimensional accuracy between the portions to which the upper and lower fastening portions are to be fastened, without being adversely affected by the welding process.

As a result, the work of constructing the body frame can be facilitated by separately sub-assembling the front body frame and the rear body frame, and constructing the body frame by integrally fastening the sub-assemblies to each other.

Also, since the upper fastening portions provided at the right and left front ends of the seat rails are connected to each other with the cross member, it is possible to ensure the strength of the upper fastening portions, and hence to increase the transverse rigidity of the body frame. Accordingly, the body frame having such a high transverse rigidity can be suitably used for a four-wheeled buggy of a type including two front wheels and two rear wheels, wherein the rear wheels are supported via a common axle on the right and left sides of a rear end of a rear swing arm with its front end swingably supported by a vehicular body. The body frame is also applicable to a sport buggy which particularly requires a high transverse rigidity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Hereinafter, one embodiment in which the present invention is applied to a four-wheeled buggy will be described with reference to the drawings.

Figure 1:
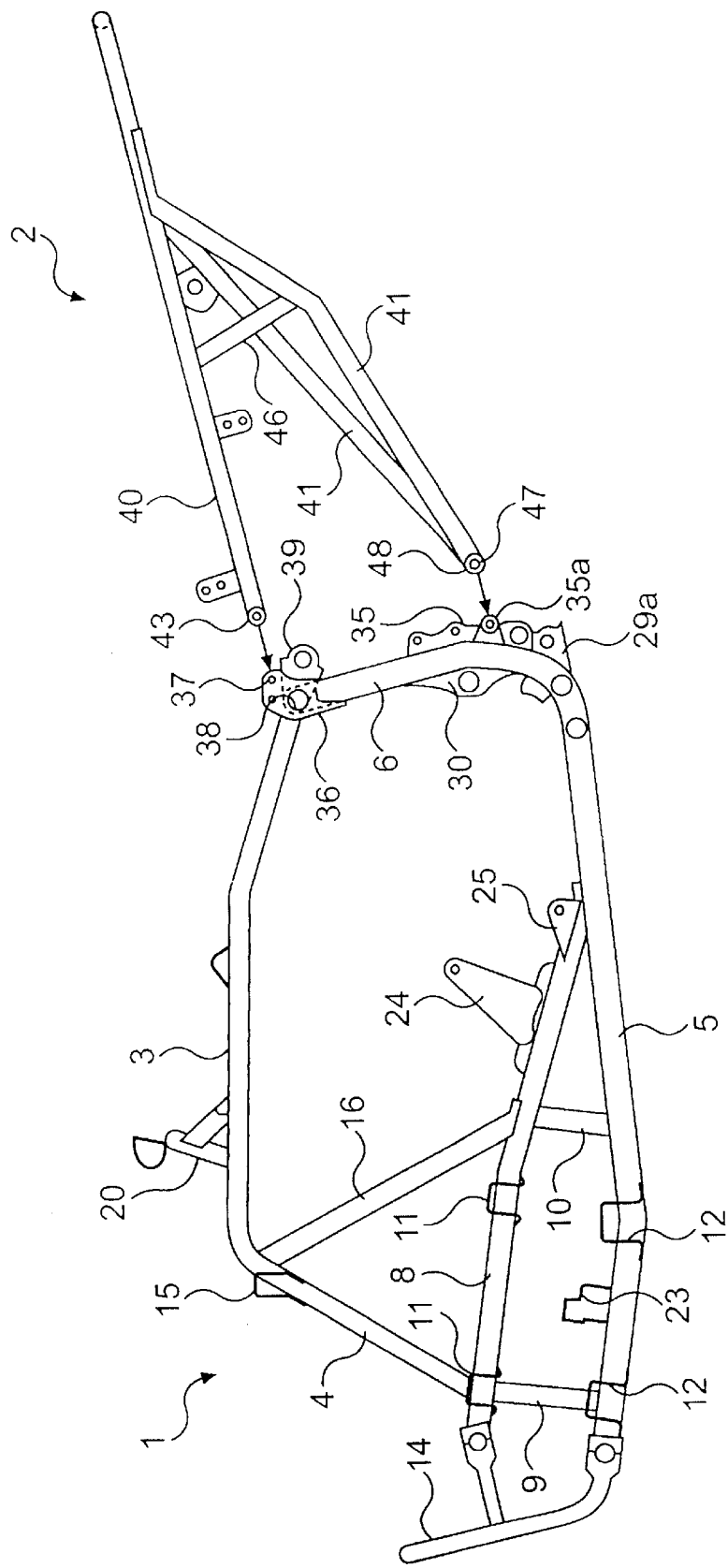
FIG. 1 is a side view illustrating a body frame according to an embodiment of the present invention.
Figure 2:
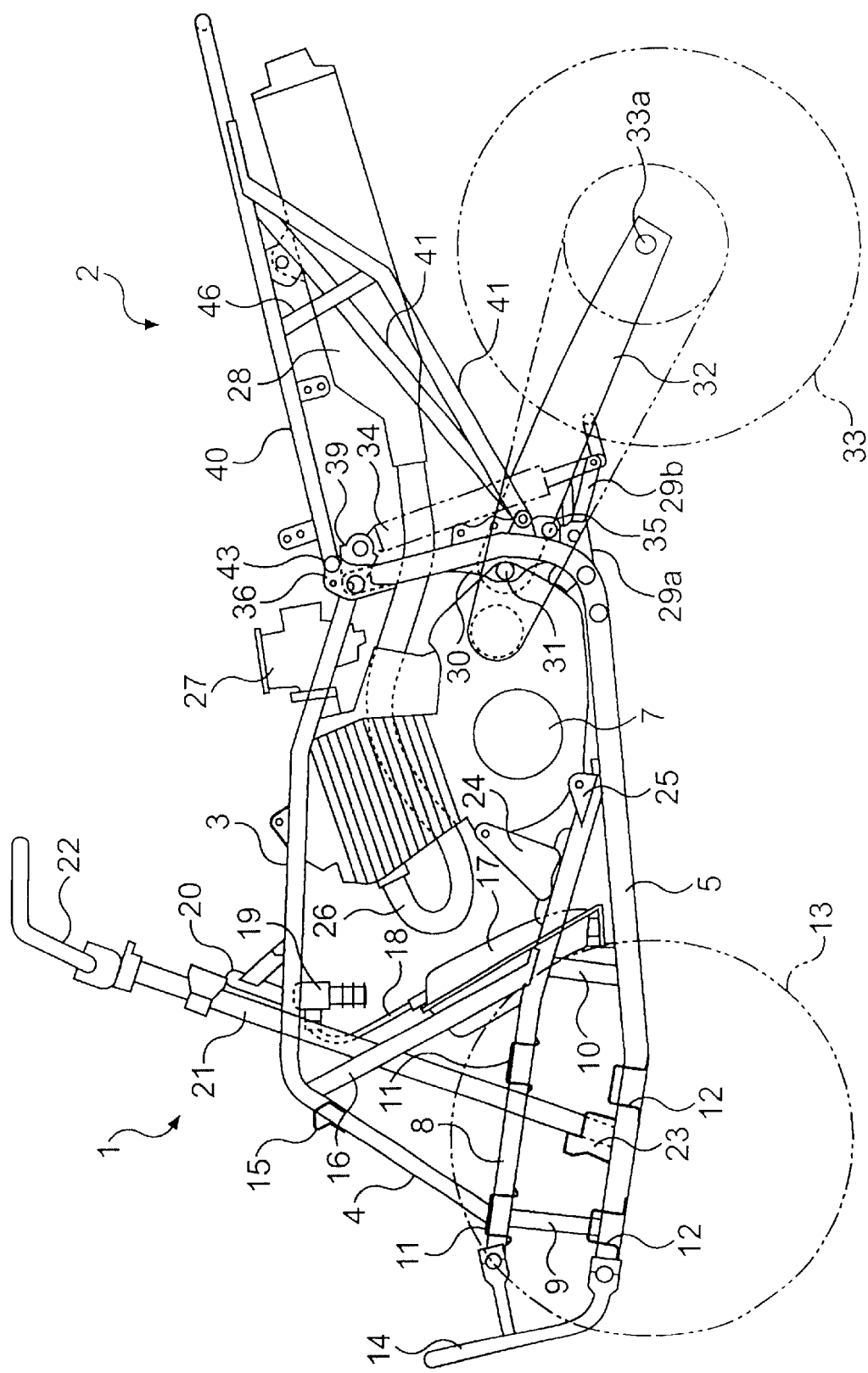
FIG. 2 is a side view showing an entire configuration of an essential portion of a vehicular body.
Figure 3:
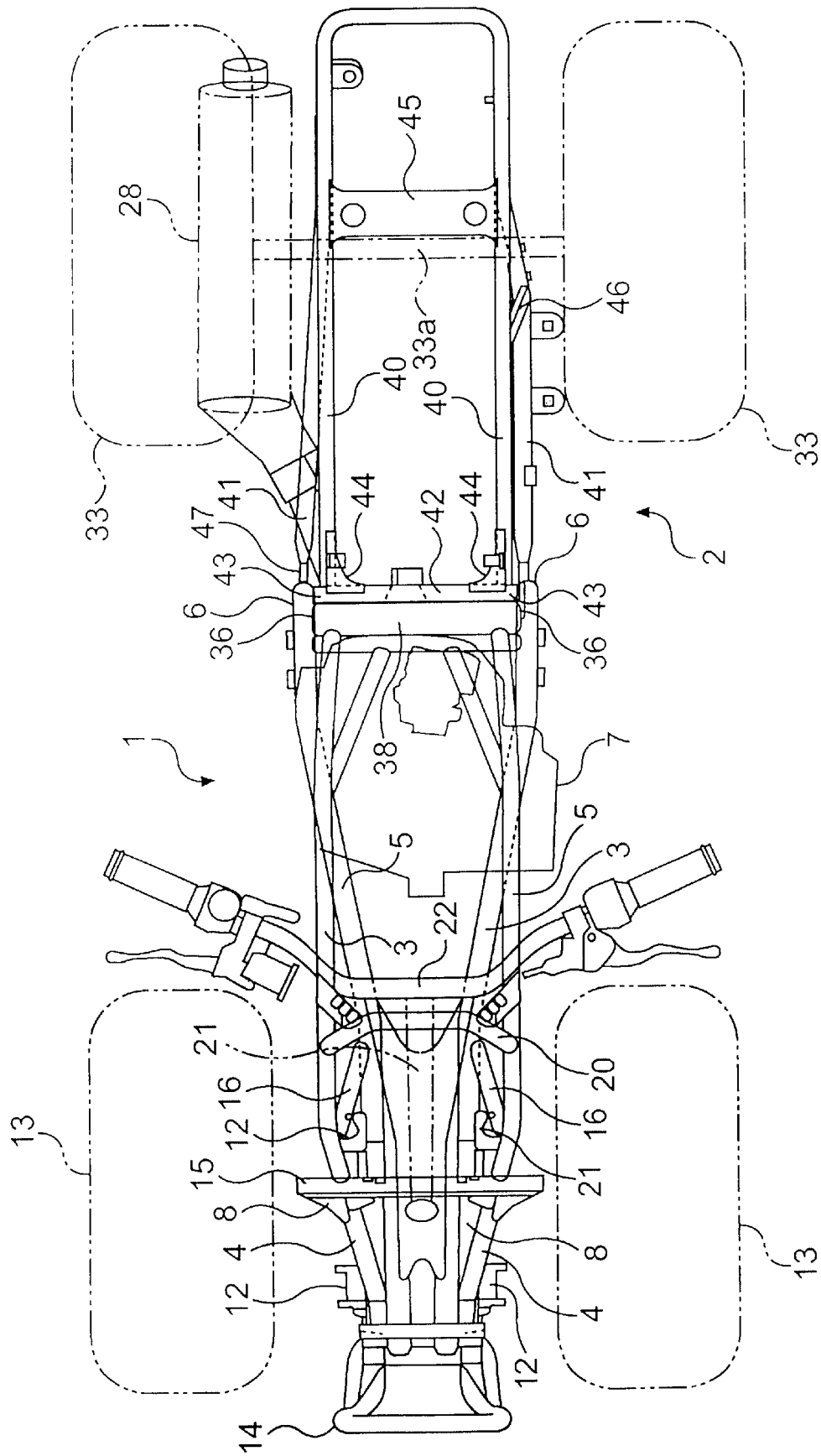
FIG. 3 is a plan view of FIG. 2.

As shown in FIGS. 1 to 3, a body frame according to this embodiment is constructed by preparing a front sub-assembly 1 constituting a front body frame and a rear sub-assembly 2 constituting a rear body frame, and fastening the rear sub-assembly 2 to the front sub-assembly 1.

The front sub-assembly 1 for supporting an engine 7 is composed of a pair of right and left sub-assembly parts each of which is formed as an approximate loop shape as seen from a side view and which includes a main frame 3, a front down frame 4, a lower frame 5, and a center frame 6.

The main frame 3 extends in the longitudinal direction while passing above the engine 7. The front down frame 4 is continuous to a front end of the main frame 3 in such a manner as to extend forwardly, obliquely downwardly therefrom. A lower end of the front down frame 4 is welded to a front portion of a reinforcing member 8 extending obliquely upwardly from the lower frame 5.

A front end of the reinforcing member 8 is connected to a front end of the lower frame 5 with a front pipe 9. An intermediate portion of the reinforcing member 8 is connected to an intermediate portion of the lower frame 5 with an intermediate pipe 10. Under the engine 7, a rear end of the reinforcing member 8 is directly welded to a portion behind the intermediate portion of the lower frame 5. Connecting brackets 11 and 12 for upper and lower arms (not shown) constituting a double wishbone type suspension for suspending front wheels 13 are provided on the reinforcing members 8 and the lower frame 5, respectively. To be more specific, two pieces of each of the brackets 11 are located on each reinforcing member 8 at positions spaced in the longitudinal direction, and two pieces of the brackets 12 are located on each lower frame 5 at the corresponding positions spaced in the longitudinal direction.

A bumper 14 is connected to the front ends of the right and left reinforcing members 8 and to the right and left lower frames 5. A stay 15 for supporting an upper end of a damper (not shown) of a front suspension is hung between the vicinities of the right and left curved boundaries between the right and left main frames 3 and the right and left front down tubes 4.

A reinforcing pipe 16 extends obliquely rearwardly and downwardly from a portion, in the vicinity of the stay 15 of each main frame 3, to a portion connected to the intermediate pipe 10 of each reinforcing member 8. An oil tank 17 is supported by the right and left reinforcing pipes 16. The oil tank 17 positioned in front of the engine 7 is surrounded by the right and left reinforcing pipes 16, the right and left reinforcing members 8, the right and left lower frames 5, and the like, and is connected to an oil cooler 19 via a tube 18. The oil cooler 19 is suspended from portions of the main frames 3 and positioned above the oil tank 17.

A steering shaft 21 supporting stay 20 is provided on portions at the main frames 3, in the vicinity of the oil cooler 19, and the steering shaft 21 is turnably supported by the stay 20. A handlebar 22 is mounted on an upper end of the steering shaft 21. A lower end of the steering shaft 21 is supported by bearing portions 23 provided on the lower frames 5. One end of a tie rod (not shown) is connected to a portion near the bearing portion 23.

Figure 5:
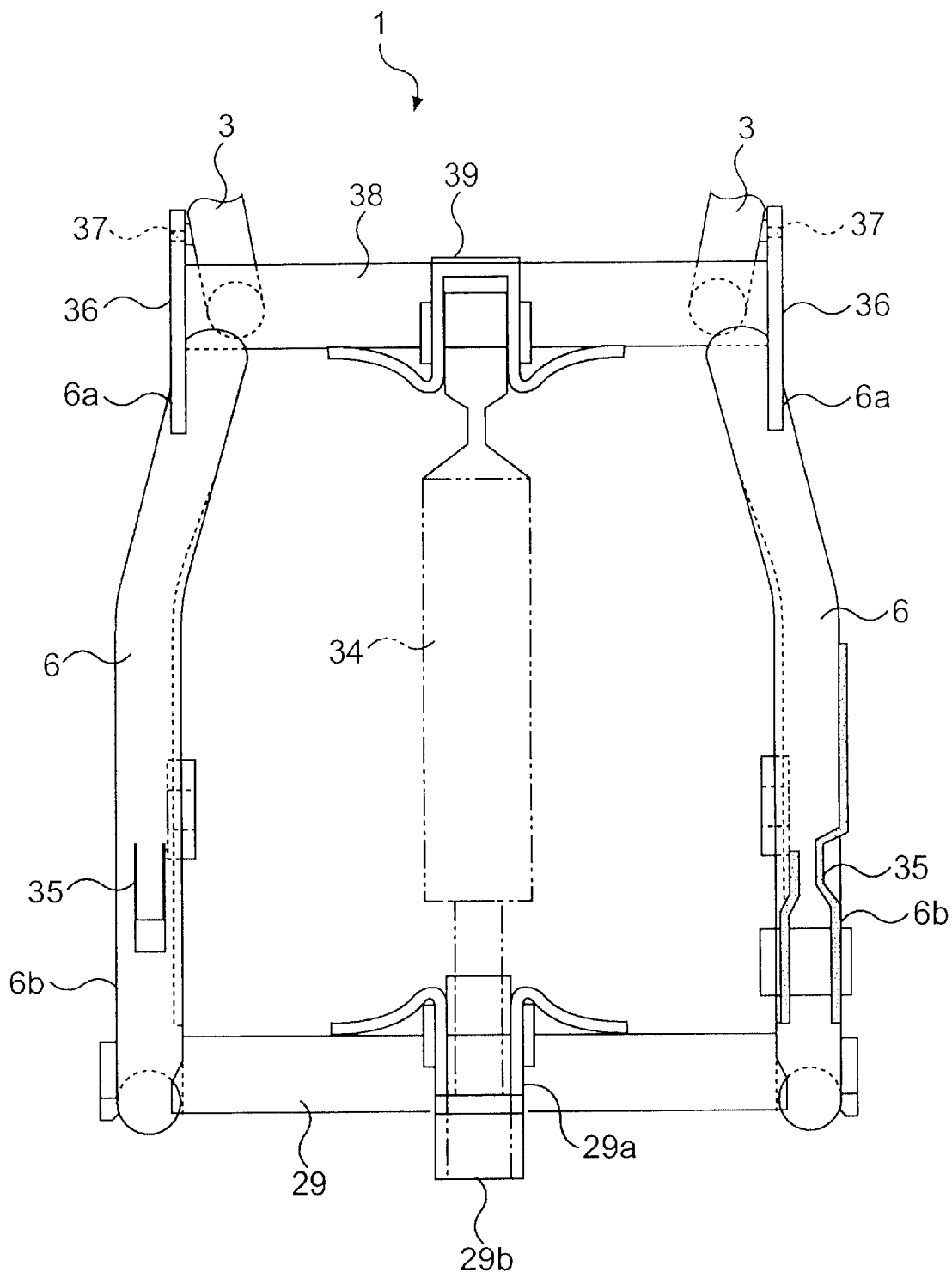
FIG. 5 is a rear view of the front body frame.
Figure 6:
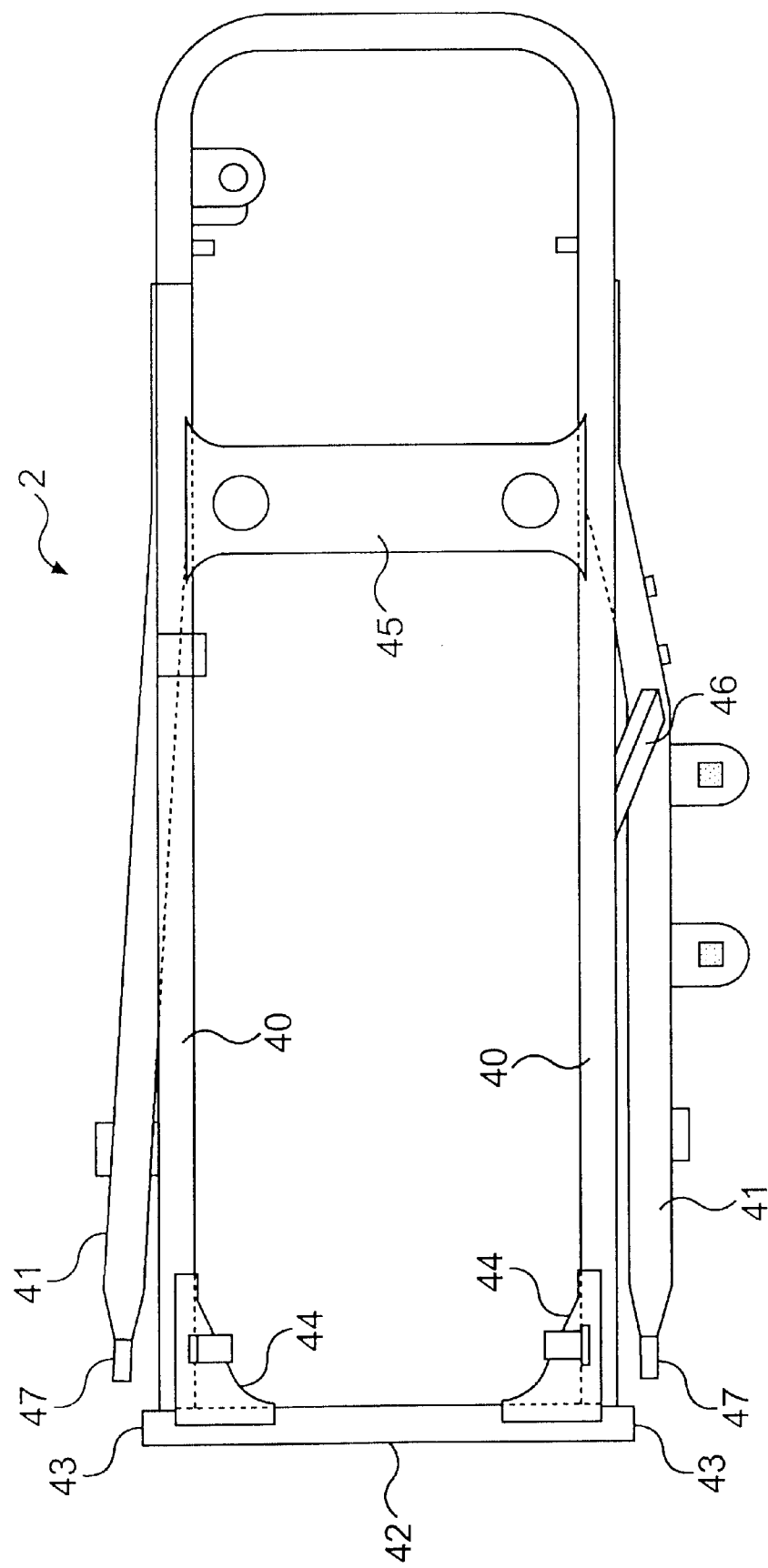
FIG. 6 is a plan view of seat rails according to an embodiment of the present invention.

In the figures, reference numerals 24 and 25 designate engine hangers provided on the lower frame 5; an exhaust pipe 26; a carburetor 27; and a muffler 28 are also shown. In FIG. 5, reference numeral 29 designates a cross pipe for connecting lower ends of the right and left center frames 6 to each other; 29a is a link bracket provided at an intermediate portion of the cross pipe 29; and 29b is a link arm for a rear wheel suspension to be described later.

A rear end of the lower frame 5 extends rearwardly while passing under the engine 7, being bent upwardly in the vicinity of a rear end of the engine 7, and is continuous to the center frame 6.

A pivot plate 30 is welded to the front side of a lower portion of the center frame 6. A front end of a rear swing arm 32 is swingably connected to the center frames 6 via a pivot 31 mounted to the right and left pivot plates 30. The rear swing arm 32 extends rearwardly from the pivot 31, and rear wheels 33 are supported by a common axle 33a on the right and left sides of a rear end of the rear swing arm 32. A damper 34 for the rear wheel suspension is provided between the rear swing arm 32 and the front sub-assembly 1.

Figure 4:
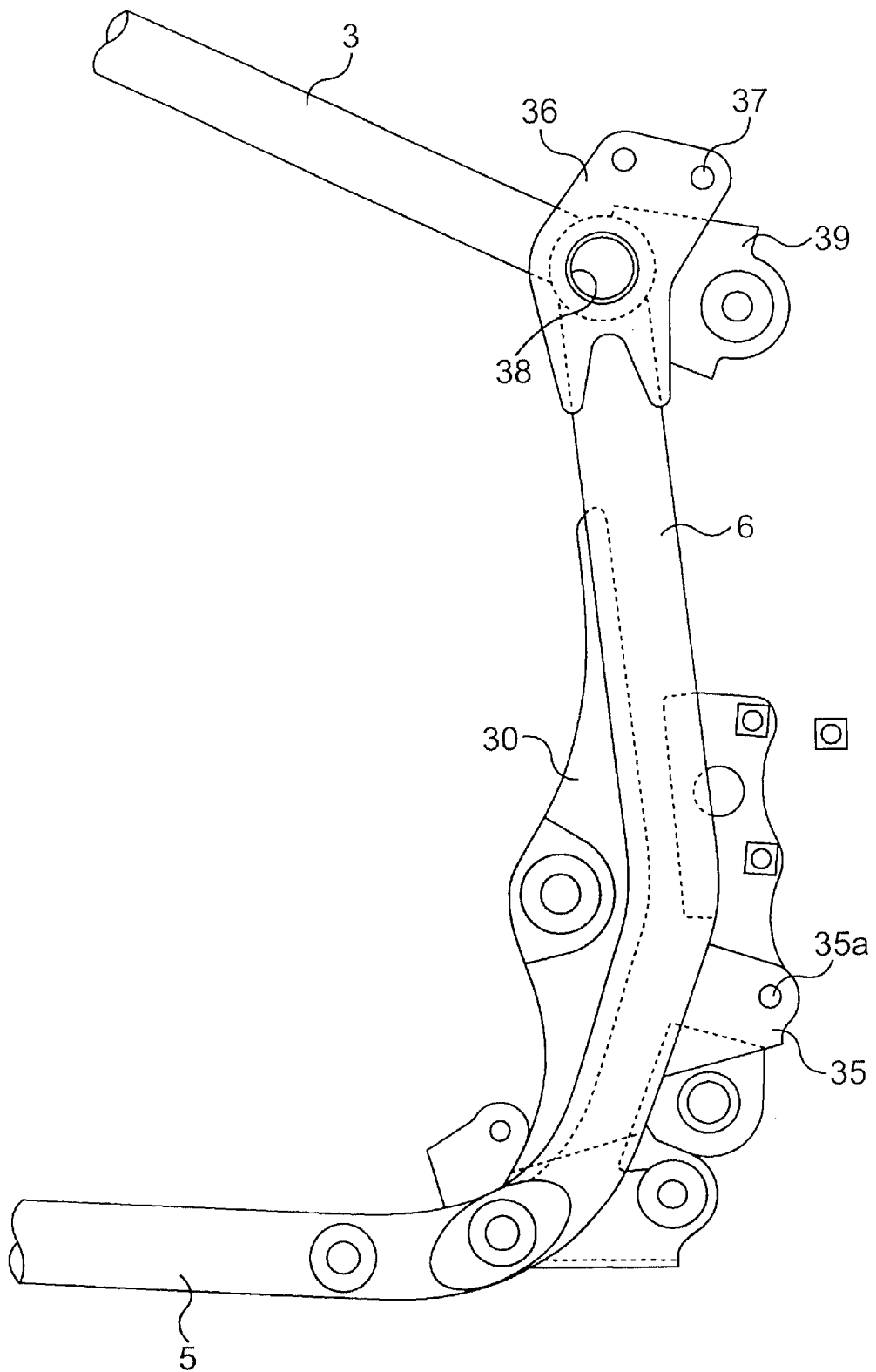
FIG. 4 is an enlarged side view showing a rear portion of a front body frame.

A stay 35, which constitutes a lower connecting portion as a mating portion with which the rear sub-assembly 2 is to be fastened, is provided on the back side of the center frame 6 at a position near the pivot 31. That is a stay 35 is positioned on a bottom end 6b of each of the center frames 6. A bracket 36, which constitutes an upper connecting portion as a mating portion with which the rear sub-assembly 2 is to be fastened, is provided in such a manner as to extend upwardly from the upper end of the center frame 6. As shown in FIG. 4, the upper end portion of the bracket 36 has mounting holes 37.

As shown in FIGS. 3 to 5, the rear ends of the main frames 3 are welded to the upper ends of the center frames 6 with a cross pipe 38. To be more specific, the cross pipe 38 is provided transversely in the width direction of the vehicular body, and the rear ends of the right and left main frames 3 are welded to the front sides of the right and left ends of the cross pipe 38, and the upper ends of the right and left center frames 6 are welded to the lower sides of the right and left ends of the cross pipe 38. Both ends of the cross pipe 38 are butted and welded to the inner sides of central portions of the brackets 36 projecting upwardly from the right and left center frames 6. A cushion bracket 39 for supporting the upper end of the damper 34 extends rearwardly from an intermediate portion of the cross pipe 38.

The rear sub-assembly 2 includes right and left seat rails 40, and a pair of right and left back stays 41 provided under the seat rails 40 in such a manner as to extend downwardly and forwardly, and are slightly spread to the right and left. The right and left back stays 41 are formed into asymmetric shapes. Front ends of the right and left seat rails 40 are connected to a pipe-like cross member 42. Right and left ends of the cross member 42 constitute upper fastening portions 43 which are to be fastened to the mounting holes 37 of the brackets 36 with bolts. Corner portions at which the cross member 42 is connected to the right and left seat rails 40 are reinforced by corner plates 44 which are welded to the cross member 42 and the seat rails 40. Intermediate portions of the right and left seat rails 40 are connected to each other with a cross plate 45, and rear ends of the right and left seat rails 40 are continuously connected to each other. The seat rails 40 are connected to the back stays 41 with a reinforcing member 46.

Plate-like lower fastening portions 47 are provided at front ends of the right and left back stays 41, and have through-holes 48. The lower fastening portions 47 are fastened to the stays 35 with bolts passing through the through-holes 48 and the mounting holes 35a of the stays 35 (see FIG. 4).

The function of the embodiment will be described hereinafter. The body frame is constructed in accordance with the following procedure. First, as shown in FIG. 1, the front sub-assembly 1 and the rear sub-assembly 2 are separately constructed by, for example welding. Then, the upper fastening portions 43 provided at both ends of the cross member 42 of the rear sub-assembly 2 are inserted between the right and left brackets 36 of the front sub-assembly 1, being aligned with the mounting holes 37 of the brackets 36, and fastened thereto with the bolts.

The lower fastening portions 47 of the right and left stays 41 are overlapped to the stays 35, and are fastened thereto with the bolts passing through the through-holes 48 of the lower fastening portions 47 and the through-holes 35a of the stays 35. In this way, the front sub-assembly 1 is integrally fastened to the rear sub-assembly 2, to construct the body frame of the embodiment shown.

In this case, since the stays 35 and the brackets 36 are welded to the center frames 6 as common members, even if the main frames 3 are welded to the center frames 6 to construct the front sub-assembly 1, there occurs no dimensional deviation between the stays 35 and the brackets 36, thereby preventing deviation in dimensional accuracy of the portions of the front sub-assembly 1 to which the rear sub-assembly 2 is to be fastened.

Accordingly, since the front sub-assembly 1 can be previously constructed by welding the relatively small-sized components before the rear sub-assembly 2 is fastened to the front sub-assembly 1, it is possible to improve the handling performance upon construction of the front sub-assembly 1, and hence to facilitate the ease of constructing of the entire body frame.

Also since the right and left seat rails 40 are connected to each other with the cross member 42 and the upper fastening portions 43 are provided at both ends of the cross member 42, it is possible to sufficiently ensure the strength of the upper fastening portions 43 and also to increase the transverse rigidity of the fastening portions of the seat rails 40. The body frame having such a high transverse rigidity can be suitably used for a four-wheeled buggy of a type including the two front wheels 13 and the two rear wheels 33 wherein the rear wheels 33 are supported via the common axle 33a on the right and left sides of the rear end of the rear swing arm 32, and also applicable to a sport buggy which particularly requires a high transverse rigidity.

Further, as is apparent from FIG. 2, since the oil tank 17 is disposed under a portion connected to the exhaust pipe 26 of the engine 7, it is possible to allow running wind to be sufficiently contact with a cylinder head of the engine 7 and the exhaust pipe 27, and hence to keep a high cooling efficiency for these parts. In addition, the arrangement position of the oil tank 17 with respect to the engine 7 is not limited to that described in the embodiment. For example, the oil tank 17 may be offset upwardly or rightwardly or leftwardly from the portion, connected to the exhaust pipe 26, of the engine 7.

The present invention is not limited to the above embodiment, and can be variously modified. For example, the pair of right and left main frames and the pair of right and left center frames constituting part of the front body frame may be replaced with a single main frame and a single center frame, respectively. In the case of the single center frame, the fastening portions of the rear body frames are fastened to the single center frame as the common mounting member.

The rear body frame may include an article supporting member such as a load-supporting platform insofar as it includes the seat rails. Further, the present invention can be applied to a saddle type vehicle such as a three-wheeled buggy or a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for forming a contiguous body frame, the method comprising:

separately constructing a front body frame and a rear body frame sub-assembly, said front body frame including a main frame extending in a longitudinal direction of said contiguous body frame;

inserting upper fastening portions provided at both ends of a cross member of the rear frame sub-assembly between right and left brackets of the front assembly;

aligning mounting holes of the right and left brackets with the upper fastening portions;

inserting a plurality of bolts through the mounting holes to fasten the front and rear frame assemblies together;

overlapping stays of the rear frame sub-assembly with stays of the front sub-assembly; and inserting a plurality of bolts through through-holes of lower fastening members of the stays of the rear frame sub-assembly and through-holes of the stays of the front sub assembly to further fasten the front and rear frame assemblies together.

2. A method for forming a contiguous body frame for a vehicle, said body frame structure for the vehicle including a front body frame; and a rear body frame, the rear body frame being fastened to the front body frame, wherein the front body frame includes first and second upper main frames extending longitudinally, first and second lower frames extending longitudinally, a cross pipe attached to a distal end of each of the first and second upper main frames, first and second center frames extending obliquely from the cross pipe, and first and second brackets attached to the cross pipe, each of the first and second brackets receiving a portion of the rear body frame to thereby fasten the rear body frame to the front body frame, wherein the front body frame further includes a stay attached to each of the first and second center frames, each of the stays receiving a portion of the rear body frame, wherein each of said stays and each of said brackets is respectively welded to said first and second center frame to prevent a deviation in dimensional accuracy, said method comprising:

separately constructing the front and the rear frame as a front sub-assembly and a rear sub-assembly;

inserting upper fastening portions provided at both ends of a cross member of the rear frame sub-assembly between the first and the second brackets of the front assembly;

aligning mounting holes of the first and the second brackets with the upper fastening portions;

inserting a plurality of bolts through the mounting holes to fasten the front and the rear frame assemblies together;

overlapping stays of the rear frame sub-assembly with the stays of the front sub-assembly; and inserting a plurality of bolts through through-holes of lower fastening members of the stays of the rear frame sub-assembly and through-holes of the stays of the front sub assembly to further fasten the front and rear frame assemblies together.

3. A method for forming a contiguous body frame for a vehicle, said body frame structure including a front body frame; and a rear body frame, the rear body frame being fastened to the front body frame, wherein the front body frame includes first and second upper main frames extending longitudinally, first and second lower frames extending longitudinally, a cross pipe attached to a distal end of each of the first and second upper main frames, first and second center frames extending obliquely from the cross pipe, and first and second brackets attached to the cross pipe, each of the first and second brackets receiving a portion of the rear body frame to thereby fasten the rear body frame to the front body frame, wherein the first and second brackets are attached to the cross pipe at first and second distal ends thereof, respectively, said method comprising:

constructing the front and the rear frame as a separate front sub-assembly and a separate rear sub-assembly;

inserting upper fastening portions provided at both ends of a cross member of the rear frame sub-assembly between the first and the second brackets of the front assembly;

aligning mounting holes of the first and the second brackets with the upper fastening portions;

inserting a plurality of bolts through the mounting holes to fasten the front and the rear frame assemblies together;

overlapping stays of the rear frame sub-assembly with the stays of the front sub-assembly; and inserting a plurality of bolts through through-holes of lower fastening members of the stays of the rear frame sub-assembly and through-holes of the stays of the front sub assembly to further fasten the front and rear frame assemblies together.

4. The method according to claim 2, further comprising attaching the first and second brackets to the first and second center frames, respectively.

5. The method according to claim 2, providing a cushion bracket for the front body frame attached to an intermediate portion of the cross pipe.

6. The method according to claim 2, further comprising:

attaching the first and the second upper main frames to a first transverse portion of the cross pipe; and attaching the first and second center frames to a second transverse portion of the cross pipe, wherein the first and second transverse portions do not overlap.

7. The method according to claim 2, further comprising:

attaching the first distal end to an interior facing central portion of the first bracket; and attaching the second distal end to an interior facing central portion of the second bracket.

* * * * *